United States Patent Office 2,934,902
Patented May 3, 1960

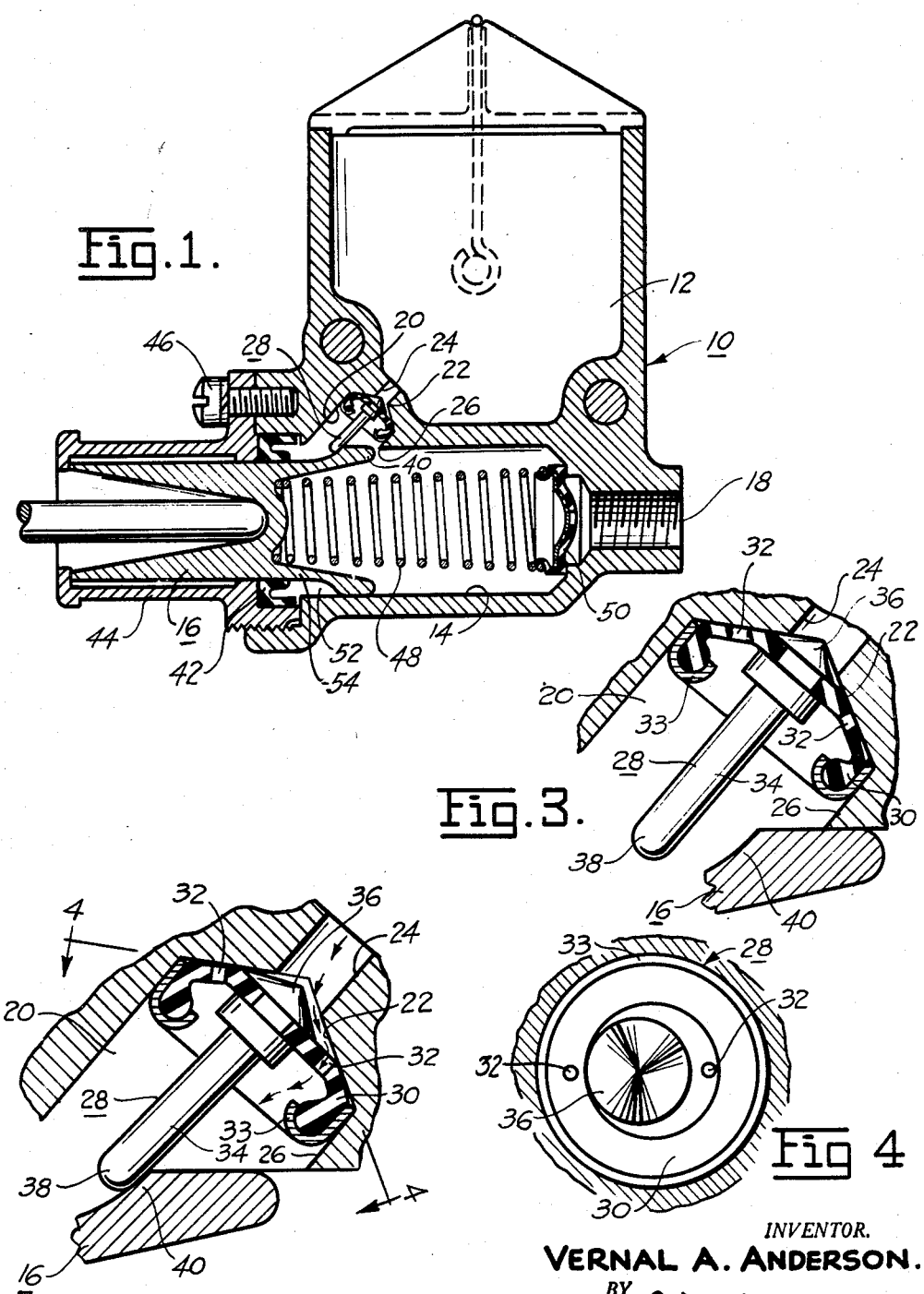

2,934,902

VALVE FOR MASTER CYLINDER

Vernal A. Anderson, South Bend, Ind., assignor to Bendix Aviation Corporation, South Bend, Ind., a corporation of Delaware Application July 1, 1955, Serial No. 519,358

4 Claims. (Cl. 60—54.6)

This invention relates to a tilting valve for a master cylinder which forms a part of a hydraulic braking system.

The principal object of the invention is to devise a tilting valve which will release from sealing engagement with a shoulder within a fluid passage to prevent formation of vacuum in the master cylinder bore. It is my aim that this release be timely so that air is not sucked into the hydraulic system during retraction of the plunger in the fluid motor.

A further object of the invention is that the valve may be easily held in an open position during retraction of the plunger, but when the plunger moves on an applying stroke, it is a feature of the invention that the valve will immediately close and seal off the reservoir and cylinder bore. In accordance with this feature, it is my purpose to prevent any loss of pressure developed by plunger movement resulting from fluid transfer out of the bore and into the reservoir.

It is a yet further object of the invention to realize these foregoing objects in a simple and inexpensive device which is reliable in operation.

Other objects and features of the invention will become apparent from the following description, taken in connection with the accompanying drawings, wherein:

Figure 1 is a section view of the master cylinder taken through the longitudinal axis of the cylinder bore;

Figure 2 is an enlarged detail view of the tilting valve;

Figure 3 shows the valve in a closed position assumed when the plunger is moved from retracted position; and Figure 4 is a top view of the valve looking in the direction indicated by the numerals 4—4 of Figure 2.

Master cylinder 10 in Figure 1, includes a reservoir 12, a cylinder bore 14, and a plunger 16 reciprocably movable in the bore 14. A passage 18 leads from the master cylinder 10 to fluid lines which connect with fluid motors for hydraulic brakes (not shown).

A stepped diameter passage 20 interconnects reservoir 12 with cylinder bore 14. A shoulder 22 is formed at the confluence of the smaller diameter portion 24 and larger diameter portion 26 of the passage 20.

A tilting valve, designated generally by numeral 28 controls the flow of fluid through the passage 20, from the reservoir 12 to bore 14. The tilting valve 28 comprises a resilient seal 30 formed of rubber or the like and generally conically shaped. The resilient seal 30 has a plurality of openings 32 which are formed in that portion which is engageable with shoulder 22.

An annular retainer 33 is used to hold the seal 30 against the shoulder 22.

A stem 34 is molded at one end 36 in the resilient seal 30. The stem 34 extends from the resilient member 30 through the larger diameter portion 26 of the passage 20 and into the bore 14. End 38 of the stem 34 is engageable with end 40 of the plunger 16. It will be noted that the end 40 slides in the cylinder bore 14 and provides bearing for the plunger 16.

A seal 42 closes one end of the cylinder bore 14 and prevents passage of fluid between the plunger 16 and an extending sleeve 44 which is attached to the master cylinder by screws 46. A spring 48 maintains the plunger 16 in a normally retracted position and a residual pressure check valve 50 is located between the bore 14 and the outlet passage 18. The residual pressure check valve does not form a part of the present invention; any suitable residual pressure check valve may be used.

When the brake is released, the plunger 16 is held in the position shown in Figure 1 by the spring 48. When the plunger 16 is positioned as shown in Figures 1 and 2, the head 40 on the plunger contacts the end 38 of stem 34 and turns the stem 34 on valve seat or shoulder 22. When the stem 34 is thus turned, the resilient member 30 is twisted away from sealing engagement with the shoulder 22 so that fluid can pass between the shoulder 22 and the resilient member 30 and flow through the opening 32 in the manner indicated by the arrows in Figure 2. Fluid is thus transferred from the reservoir 12, through the tilting valve and into the annular chamber 52 formed between the reduced diameter skirt 54 and the cylinder bore 14. There is sufficient clearance between the enlarged head 40 of the plunger 16 and the bore 14 so that fluid can pass freely in either direction. In this manner there is provided a compensating flow of hydraulic fluid from the reservoir 12 into the bore 14 when the plunger 16 is retracted.

A second function of the tilting valve 28 is to compensate for vacuum which develops in the bore 14 while the plunger 16 is being pushed to a retracted position following a brake application. In this instance, plunger 16 is moved toward the left after it has occupied an applying position farther toward the right in Figure 1. This causes a sudden reduction in pressure which is communicated from the right hand side of the plunger to the left hand side thereof and is established within the annular chamber 52. When this occurs, the atmospheric pressure prevailing in the reservoir 12 pushes hydraulic fluid from the reservoir through the tilting valve master cylinder, and into the annular chamber 52. The fluid in chamber 52 then flows past the enlarged head 40 and toward the residual pressure check valve 50 to relieve the vacuum formation in bore 14.

It will thus be seen that the tilting valve 28 serves as a compensator by being held in an open position when the plunger 16 is fully retracted. The tilting valve further serves to prevent formation of vacuum within the master cylinder bore when the plunger is moving on its retracting stroke.

Numerous modifications of the invention may be made without departing from the principles of the invention. Such modifications and revisions are considered to be within the purview of the invention, and are intended, therefore, to be included within the scope of the following claims.

I claim:

1. A valve adapted for use in combination with a master cylinder having a cylinder bore and a piston reciprocably mounted in said bore and provided with a reduced diameter skirt forming an annular chamber between said reduced diameter skirt and said bore, a fluid reservoir within said master cylinder, and a countersunk fluid passage connecting said fluid reservoir and annular chamber, said valve serving to control communication through said fluid passage and comprising a resilient member having openings therein and adapted to be located in the countersunk portion of said passage, means for retaining said resilient member within said passage, said resilient member being normally held against the countersunk portion of said fluid passage to seal the openings in said resilient member, a stem having a boss which is molded on the center of said resilient member, said boss extending within the reduced diameter portion of said passage for tilting movement therein, the end of said stem being located within the reduced diameter skirt of said piston for engagement with a part of said piston whereby piston movement causes the stem to twist the resilient member so that the openings therein permit fluid passage from said fluid reservoir to the annular chamber when the piston is in retracted position.

2. Valve means adapted for use in a master cylinder having a cylinder bore, a plunger reciprocably mounted in said bore, a reduced diameter skirt on said plunger forming an annular chamber in conjunction with said bore, a reservoir for hydraulic fluid, and a passage interconnecting the annular chamber and reservoir and formed with a stepped first and second diameter portion with a shoulder therebetween, said valve means comprising a resilient member having apertures therein, the apertured portion of said resilient member being engageable with said annular shoulder to seal said apertured portion, means for yieldably holding said resilient member within the larger diameter portion of said passage, and a stem which is molded at one end to the central portion of said resilient member and engageable with said piston at the other end thereof, said stem being caused to tilt by retractile movement of said piston to twist said resilient member away from sealing engagement with said shoulder whereby the openings therein permit fluid flow from said reservoir to the cylinder bore when the plunger is in retracted position.

3. A tilting valve adapted for operation in a master cylinder having a reservoir, a cylinder bore, a stepped diameter passage interconnecting said reservoir and cylinder bore, and a shoulder formed at the confluence of the stepped diameter portions of said passage, said tilting valve comprising a resilient member having a plurality of openings therein which control flow of fluid through said passage, said resilient member being sealingly positioned against said shoulder, a retaining means for holding said resilient member within the larger diameter section of said passage, and a stem fixedly positioned in the central portion of said resilient member and extending therefrom into said cylinder bore, and a plunger reciprocably mounted in said bore and engageable with said stem to produce turning thereof in such a way that said resilient member is twisted away from sealing engagement with said shoulder to permit flow of fluid from the reservoir through the apertures in said sealing member and into said bore, said stem being contacted by said plunger to twist said seal when said plunger is in a retracted position whereby communication is established between said reservoir and bore.

4. A tilting valve for a stepped diameter passage, comprising an apertured resilient member which bears against a shoulder formed in said passage and seals the apertures in said resilient member, a stem which is molded at one end into said resilient member, means for sealingly securing the surface of said resilient member in sealing engagement with said shoulder, and a reciprocable member which contacts one end of said stem to twist the surface of said resilient member away from sealing engagement with the shoulder in said passage, said resilient member being so formed that the resilience thereof serves to urge the surface of the resilient member into sealing engagement with said shoulder.

References Cited in the file of this patent

UNITED STATES PATENTS

| | | |
|---|---|---|
| 1,439,763 | Schaffer | Dec. 26, 1922 |
| 2,104,220 | Bowen | Jan. 4, 1938 |
| 2,185,072 | Bowen | Dec. 26, 1939 |
| 2,299,599 | Shultz | Oct. 20, 1942 |
| 2,526,457 | Bradbury | Oct. 17, 1950 |
| 2,552,033 | Bradbury | May 8, 1951 |
| 2,598,417 | Niemann | May 27, 1952 |
| 2,638,929 | Delany et al. | May 19, 1953 |
| 2,681,752 | Jarrett et al. | June 22, 1954 |
| 2,682,977 | Spiess et al. | July 6, 1954 |
| 2,707,481 | McPherson | May 3, 1955 |